April 15, 1941.    T. H. GAGEN    2,238,166

PACKING SPACER

Filed May 4, 1939

INVENTOR.
THOMAS H. GAGEN
BY Robert W. Wilson
ATTORNEY.

Patented Apr. 15, 1941

2,238,166

UNITED STATES PATENT OFFICE 2,238,166

PACKING SPACER

Thomas H. Gagen, Sandusky, Ohio, assignor to The Hinde & Dauch Paper Company, Sandusky, Ohio, a corporation of Ohio Application May 4, 1939, Serial No. 271,685

4 Claims. (Cl. 206—46)

This invention has to do with the packing of bicycles in crates for shipment, and particularly with means for preventing movement of bicycles in such crates. It is customary to pack a bicycle in a crate just slightly wider than the width of the forks, detaching handle bars, saddles and pedals, these items being included in the same crate, but separately wrapped and thus to some extent filling up what would otherwise be waste space. With this type of packing a problem arises as to keeping the bicycle from slipping sideways. The crates are usually made of wood slats or light wooden material, and have bottom front and rear chocks into which the wheels fit. It has been customary to prevent the upper part of the bicycle from moving by fastening wooden cross pieces in the crate, one of these holding the handle bar post in proper lateral position, and the other doing the same for the saddlepost. Each of these pieces has to be fastened to the crate to prevent turning or other movement.

The purpose of the present invention is to get away from the disadvantages of the standard arrangement, by using a single piece of material which will be applicable both to the handle bar post and to the saddle seat post, which will be automatically spaced at the mid-distance between the sides of the crate, and which will by its inherent construction be incapable of being turned or displaced after once positioned upon the parts of the bicycle. Other purposes include lessening of time and work in packing the bicycles, saving of material cost, compactness of disposition of the spacers until needed for use and reduction of expense. Further purposes and aims of the invention will appear from the following description which illustrates a preferred form in connection with the drawing, although the invention is not limited to such form.

Figure 1:
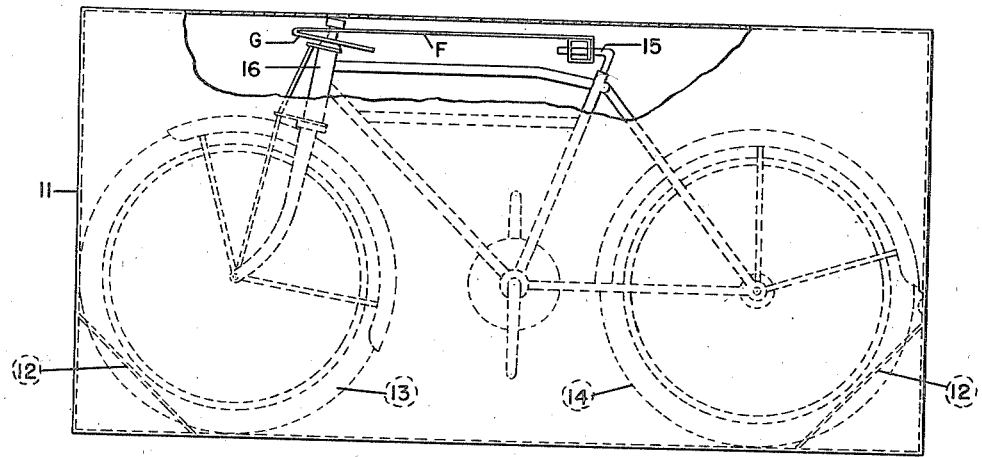
Fig. 1 is a side view of a bicycle in a crate, showing the application of my invention thereto.
Figure 2:
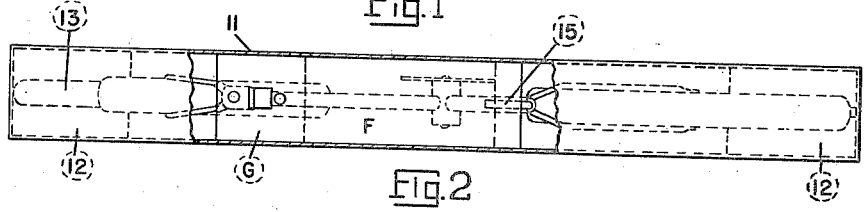
Fig. 2 is a corresponding plan view.
Figure 3:
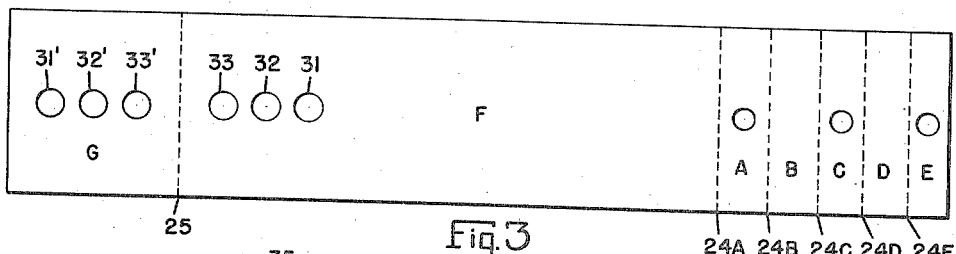
Fig. 3 shows a blank from which my spacer is made.

Referring now particularly to Figs. 1 and 2, the customary method of fastening the bicycle is to enclose the bicycle, shown in outline in those figures, in a crate 11, with suitable chocks 12 in the lower front and rear corners of the crate to hold the wheels 13 and 14. The pedals, handle bar and saddle are removed and packed at convenient available spaces in the crate, and are not shown in the figures. The spacer of my present invention comprises a sheet of corrugated board sufficiently stiff to resist side sway of the crated machine, for example standard double face corrugated board, cut into a blank, Fig. 3, of sufficient length for certain folding operations hereafter described, and wide enough to fit the inside width of the crate snugly. This blank is creased or otherwise prepared for folding along transverse lines 14A, 14B, 14C, 14D and 14E, thus dividing the rear portion of the blank into short panels A, B, C, D and E, each the full width of the blank. Of these A, C and E are centrally perforated to receive the seat post 15 when the panels are folded into the square tube or box formation shown in Fig. 4. Across fold line 25 divides the main panel F of the blank from an approximately square forward panel G which is folded under the main panel as shown in Fig. 4, when the spacer is set up for use.

Figure 4:
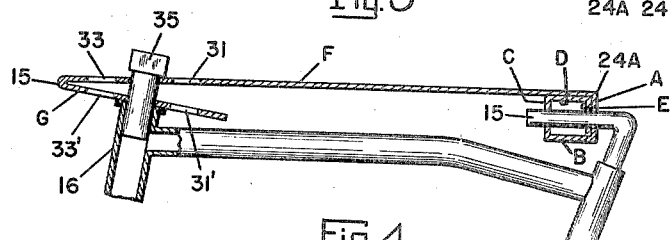
Fig. 4 is an enlarged detail, being a central vertical longitudinal section showing my spacer applied to a bicycle frame.
Figure 5:
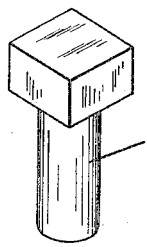
Fig. 5 is a perspective showing one form of a peg for use with my invention.

To apply the spacer the panels A, B, C, D, E are successively folded about their crease lines into the square tubular formation of Fig. 4, with E against and inside of A and with D under the rear of F. This brings the perforations in A, C and E into horizontal registry so that the folded box thus formed can be slipped onto the seat post 15, and is held by the post itself against coming undone. It is not necessary to fasten any element of the spacer to the crate walls.

It is customary in the bicycle industry to have frame sizes vary by two-inch steps. In order to meet this condition and adapt my spacer for several sizes of frames, I perforate the panels F and G at two-inch intervals, as shown at 31, 32 and 33 in panel F and corresponding perforations 31', 32' and 33' in panel G. A suitable fastener, which may be a large-headed wooden peg 35, fits through any selected pair of the front perforations and fastens into the upper end of the handle bar post 16, as shown in Fig. 1, thus fixing the spacer with respect to the front part of the bicycle frame. It is apparent that some other sort of clip or fastener could be substituted for the peg. In this way the spacer is fixed at front and rear, the front attachment preventing side motion and also keeping the spacer from slipping off the seat post, and the rear attachment also preventing sidewise motion. The width of the spacer is equal to the width of the crate, for which reason the entire length of each edge of the spacer serves to bind or bear against the inside of the crate and prevent any sideward motion, without the necessity of fastening the spacer to the crate in any way other than by its own close fit therein. The height of the peg 35 is such the crate lid bears down upon the peg head, as seen in Fig. 1.

In setting up and handling this spacer for assembly in the packing room, the post 35 can be put into whichever pair of holes is proper for the size of bicycle being packed, and will not readily fall out during ordinary handling before the spacer is applied, because of the natural resiliency of the corrugated board material tends to spread the front panel G from the main panel F and thus cramp the peg in place.

In this way the operator can take the spacer in both hands, fold the panel G under and set the peg 35 in the proper pair of holes, then roll the panels E, D, C, B and A into box formation, slide this box onto the seat post 15, and with his other hand push the peg 35 down into the open top of the handle bar post. The hinge at 24A permits relative bending of the panels F and G after the rear "box" is on 15, so that my spacer can be applied after the bicycle is down in its crate.

From the foregoing it will be seen that I have invented a spacer adapted for maintaining the transverse position of a packed object, more particularly in a narrow crate, and although specifically shown as applied to a bicycle, it is constructed upon principles adaptable to other packed objects to meet similar requirements. The foregoing description is of course intended as illustrative rather than limiting character, the principles of the invention being susceptible to application in other detailed forms, all within the scope of the appended claims.

I claim:

1. A bicycle packing spacer comprising a stiff sheet material panel substantially the length from front post to rear post of a bicycle to be packed, and substantially the width of a container for said bicycle, a plurality of panels successively transversely hinged to and beyond one end of the first-named panel and adapted for folding into a tubular structure, a panel transversely hinged to the front of said first-named panel and foldable thereupon, and means in each of said folded portions for engagement with the packed bicycle.

2. A bicycle packing spacer comprising a strip of stiff sheet material of width equal to the corresponding space in a bicycle container, and including a plurality of transverse panels folded upon themselves into a box-like portion, a connecting panel, and a panel folded towards said connecting panel at the end opposite said box-like portion, perforations in certain of said transverse panels mutually registering horizontally in the box-like formation, perforations in said connecting panel and in the panel folded towards it, a peg adapted to be placed through a pair of said last-named perforations and be held therein by misalignment of the perforations and adapted to enter the top of the handle bar post of a packed bicycle, and the perforations in said box-like structure being adapted to receive the seat post of the same bicycle.

3. A device for packing a bicycle, comprising a sheet of stiff material attachable to the top of the frame of the bicycle to be packed, said sheet being of width equal to that of the packing space and having a main body and an end folded backwardly at an angle to said main body, perforations in said main body and in said back-folded end aligned with each other and with the axis of a frame member of the packed bicycle, means cooperating with said perforations and with said frame member securing said frame member to said sheet, and further frame-engaging elements at the rear of the device.

4. A bicycle packing spacer comprising a stiff main panel of material adapted to extend over the space between front and rear posts of a bicycle frame to be packed and substantially the width of a container for said bicycle, a supplemental panel transversely hinged to the front end of said main panel and adapted to fold back thereunder but at an angle thereto, holes in said supplemental and main panels approximately aligned when said supplemental panel is folded, and a member going through said aligned holes and engaging the front post of the packed frame, a panel transversely hinged to the opposite end of said main panel, and a perforation therein adapted to receive the horizontal seat post of the packed frame.

THOS. H. GAGEN.